W. E. MOORE.
CONE BAKING MACHINE.
APPLICATION FILED FEB. 7, 1919.

1,389,774.

Patented Sept. 6, 1921.
10 SHEETS—SHEET 5.

W. E. MOORE.
CONE BAKING MACHINE.
APPLICATION FILED FEB. 7, 1919.

1,389,774.

Patented Sept. 6, 1921.
10 SHEETS—SHEET 9.

W. E. MOORE.
CONE BAKING MACHINE.
APPLICATION FILED FEB. 7, 1919.

1,389,774.

Patented Sept. 6, 1921.
10 SHEETS—SHEET 9.

Witnesses:
Robert F. Weir
Arthur W. Carlson

Inventor
William E. Moore
Fonce Bain & Cook
Attys.

UNITED STATES PATENT OFFICE.

WILLIAM E. MOORE, OF CHICAGO, ILLINOIS, ASSIGNOR TO ANGUS HENDERSON, OF CHICAGO, ILLINOIS.

CONE-BAKING MACHINE.

1,389,774.  Specification of Letters Patent.  Patented Sept. 6, 1921.

Application filed February 7, 1919. Serial No. 275,641.

*To all whom it may concern:*

Be it known that I, WILLIAM E. MOORE, a citizen of the United States, residing at Chicago, in the county of Cook and State of Illinois, have invented certain new and useful Improvements in Cone-Baking Machines, of which the following is a specification.

This invention relates to improvements in apparatus for molding and baking pastry cups, or receptacles, and more particularly cup shaped ice cream holders.

One of the objects of my invention is to provide such an apparatus in which a plurality of cups may be baked simultaneously and subsequently ejected from the molds with little likelihood of being broken.

Another object is to provide a machine in which the mold parts may be easily separated, one part being swung to one side out of register with the other part, giving easy access to the mold surfaces for cleaning or greasing and also exposing the hollow mold parts for the reception of a fresh charge of batter.

A further object of the invention is to provide mechanism for operating and properly timing the separation of the molds, the ejection of the cups, and the depositing in the molds of measured charges of batter.

Another object of the invention is to provide efficient and easily operated means for trimming or shearing the edges of the cones either after they are baked or during the process of baking.

Still other objects of the invention are to provide such an apparatus of sturdy, rugged construction, not liable to derangement or accidental breakage, easily manipulated, and highly efficient in operation.

Still other and further objects will become apparent to those skilled in the art from a consideration of the following description and drawings, wherein—

Fig. 8 is a vertical sectional view on the line 8—8 of Fig. 4.

Fig. 9 is a fragmentary sectional view on the line 9—9 of Fig. 2.

My improved apparatus comprises in general a stand or table in the upper portion of which is carried a plurality of cone forming molds with which coöperate a corresponding number of plungers for shaping the interiors of the cones. The plungers are carried in a head supported on the table and connected therewith to permit vertical movement of the head until the molds and plungers are out of horizontal alinement whereupon the head is swung to one side giving easy access to the surfaces of both the plungers and molds. In addition to this I have provided a batter tank pivotally connected to the table and which may be swung into register with the hollow molds after the head with its plungers has been moved to one side. The operation of swinging the tank into register with the molds automatically serves to discharge a measured quantity of batter into the molds, whereupon the tank is again swung to one side of the table and the plungers brought down into the molds for shaping the batter into cup form for baking. Electric heating coils or any other suitable means may be used to supply the heat for baking. The operation of both the batter tank and plunger carrying head is under the control of a single crank handle which likewise actuates the system of ejectors for moving the baked cones out from the molds after the plungers have been removed. The parts are connected so as to permit timed movement with respect to each other and in addition thereto I have provided a separately operated shearing device for trimming the edges of the cups either before or after they are baked.

The machine is adaptable to baking any type of cup or receptacle, the embodiment illustrated in the drawings being designed for baking ice cream cone containers and whereas I will hereinafter refer to the product, that is the baked receptacle, as a "cone" it will be understood that by this I do not mean to limit the invention to a machine for baking cones alone.

Referring now to the drawings, wherein I have illustrated a preferred embodiment of the invention, for the purpose of making a complete disclosure, the mechanism may be generally classified into four divisions, namely a mold separating mechanism; cone ejecting apparatus; shearing apparatus and the batter feeding device. These parts are all supported upon a single mounting which, in the present instance, comprises and annular rim 20 carried on the upper ends of four legs 21 which raise the apparatus to a suitable height above the ground so that it may be readily operated. An apron 22 projects downwardly from the lower edge of the rim 20 to provide an inclosure for the operating mechanism to protect the same from injury or accumulation of dirt. A plate or table 23 is supported on the upper edge of the rim 20 and at spaced apart intervals is provided with upwardly extending annular shoulders 24, internally threaded to receive the upper threaded ends 25 of the hollow cup forming molds 26. In the present instance 12 molds are provided as a convenient number for a machine of this size.

Coöperating with each mold 26 is a similarly shaped plunger or opposite mold-part 27, the upper end of which is threaded, as at 28, for screw threaded engagement with the interior of the downwardly projecting annular shoulder 29 formed in the plate 30. This plate 30 with its top inclosing cover or hood 31 forms the head which is movable with respect to the table.

The mechanism for separating the mold parts is inclosed within the stand and comprises a transversely positioned shaft 32 suitably supported in journals 33 and carrying at its opposite end portions the downwardly extending L-shaped crank arms 34, to the lower ends of which are pivotally connected, as at 35, the elbow shaped link 36, the upper ends of which are in turn pivotally connected, as at 37, to diametrically opposite points on the head. A segmental gear 38 is secured by means of rivets or bolts 39 to one of the cranks 34, its teeth meshing with the pinion 40, upon the end of shaft 41 which projects at right angles to shaft 32 and extends through an opening in the apron 22, carrying at its outer end a hand crank 42.

Rotation of the hand crank 42 transmits motion through shaft 41, pinion 40 and shaft 32 to the elbow links 36 which raise the central portion of the head. To insure a substantially vertical movement of the entire head on lines parallel with the axes of the molds while the plungers and molds are still in horizontal alinement I have provided at the rear of the head a depending arm 43 cast integral with the cover plate 31 extending downwardly through an opening 44 in the rim 20 to the interior of the casing. Intermediate the cranks 34 I have mounted upon the shaft 32 a pair of spaced apart arms 45, 45, the ends of which carry inwardly projecting roller pins 46, for engagement in the slotted grooves 47 of the U-shaped head 48. The grooves 47 are formed on the outer faces of the parallel legs of the U-shaped head 48 and from the base thereof an upwardly extending projection 49 makes pivotal connection, as at 50, with the lower end of the arm 43 carried by the head. From one leg of the U-shaped head 48 an arm 51 extends across the machine and is pivoted at its opposite end 52 upon a rod 53 parallel to shaft 32 secured at the opposite side of the casing in downwardly extending brackets 54.

By this arrangement of levers it is evident that rotation of the shaft 32 communicates at first a comparatively slow vertical movement to the central portion of the head, due to the arrangement of the cranks 34 which extends very nearly downwardly from the shaft so that the vertical increment of movement of the ends of the cranks during the first part of their upward movement is comparatively slight. During this same first period of movement of rotation of the shaft 32 the short arms 45, 45, serve to raise the outer end of lever 51 through their engagement with the slotted guides in the head 48, the lever 51 swinging about the shaft or rod 53 as a pivot point. The angle of the grooves 47 is so arranged that the upward movement of this end of the lever carrying with it, of course, the arm 43 mounted on rear of the head, is at substantially the same rate of speed as the upward movement of the elbow link 36 so that as the crank is rotated, during its first portion of movement the entire head is moved bodily upwardly on a substantially vertical line until the plungers are out of horizontal alinement with the molds in the table. When this point has been passed it will be apparent that the ends of the arms 45, 45 will have less lifting effect upon the lever 51 as their rollers 36 will then commence to slide in the guides 47 as the arms approach more nearly the vertical. The upward movement of the rear of the head will therefore substantially cease, whereas the upward movement of the central portion of the head due to the crank 34 will increase in rapidity until the head is swung backwardly away from the top of the table to the position shown in Fig. 6.

This arrangement of head operating links permits a separation of the mold members on lines substantially parallel with their axes, so as to permit the freeing of the baked cone with little danger of its being broken.

Figures 6, 14:
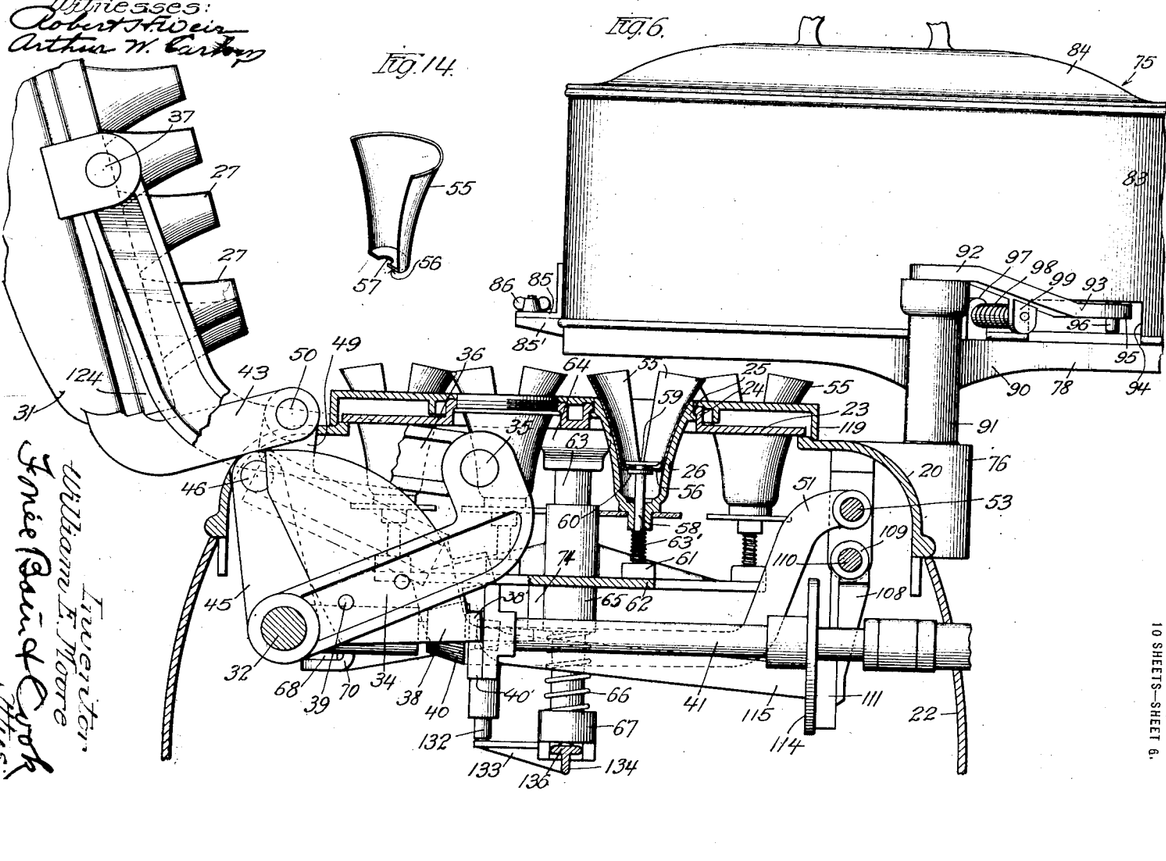
Fig. 6 is a vertical sectional view similar to Fig. 4 showing the mold parts separated.
Fig. 14 is a perspective view of one of the liner sections removed from its mold.
Figure 7:
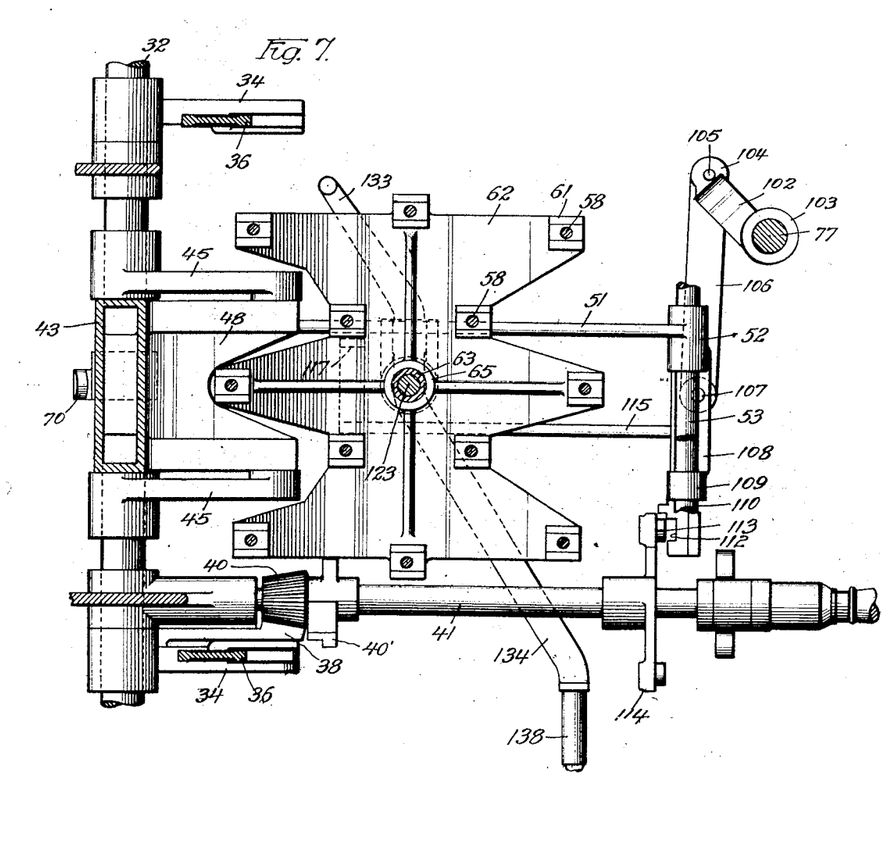
Fig. 7 is a horizontal sectional view through the operating mechanism on a line 7—7 of Fig. 5.

The apparatus for ejecting the cones from the mold members after they have been baked, comprises a sheet metal liner 55 formed from two half sections shaped to neatly interfit within the mold and when closed, that is when in normal position resting within the mold forming a complete lining for the interior of the mold member 26. The edges of the two members 55 meet in a plane passing through the axis of the mold, the bottoms being inturned, as at 56, and provided with a semi-circular opening at the bottom, which, when the liners are together, forms an aperture 57, into which projects the upper end of a stem 58 extending down through the bottom of the mold 26. On the upper end of the stem 58 is a disk or button 59 which completely fills the bottom of the liner when it is in operative position and forms, therefore the bottom of the mold lining. Immediately beneath the plunger 59, but spaced away therefrom, a slight distance, is a shoulder 60 which underlies the liner bottom so that when the plunger 58 is moved upwardly into the position shown in Fig. 6, the liners will be pushed upwardly and automatically fall out, forming two separable leaves, as shown in Fig. 6, ejecting the cup and permitting it to be readily removed without breakage. The lower ends of the plungers project below the molds 26 and are screw threaded into upstanding lugs 61 formed upon a plate 62 so that all of the ejectors may be simultaneously operated. Coil springs 63' surround the plungers 58, bearing at their upper ends against the lower ends of the molds 26 and at their lower ends against the lugs 61 on the plate 62.

A tubular guide post 63 is positioned vertically in the center of the machine and at its upper end is screw threaded into a hub shaped downwardly extending projection 64 on the plate or table 23. The ejector plate 62 is provided at its center with a hub 65 which slidably engages the tubular post 63 and serves as a guide for the vertical reciprocation of the plate. A coil spring 66 surrounds the lower end of the tubular post 63 making contact at its upper end with the lower end of the hub 65 on the plate and at its lower end engages a nut 67 screw threaded upon the lower end of the post.

Figure 12:
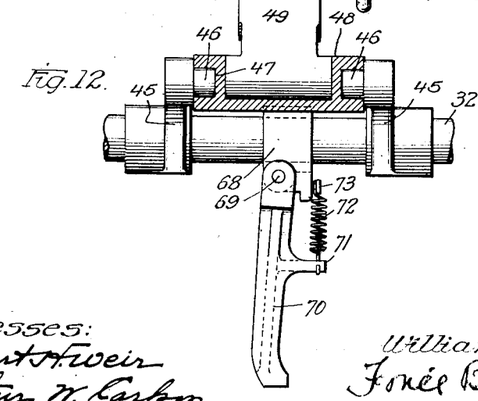
Fig. 12 is a fragmentary sectional view on the line 12—12 of Fig. 4.
Figure 13:
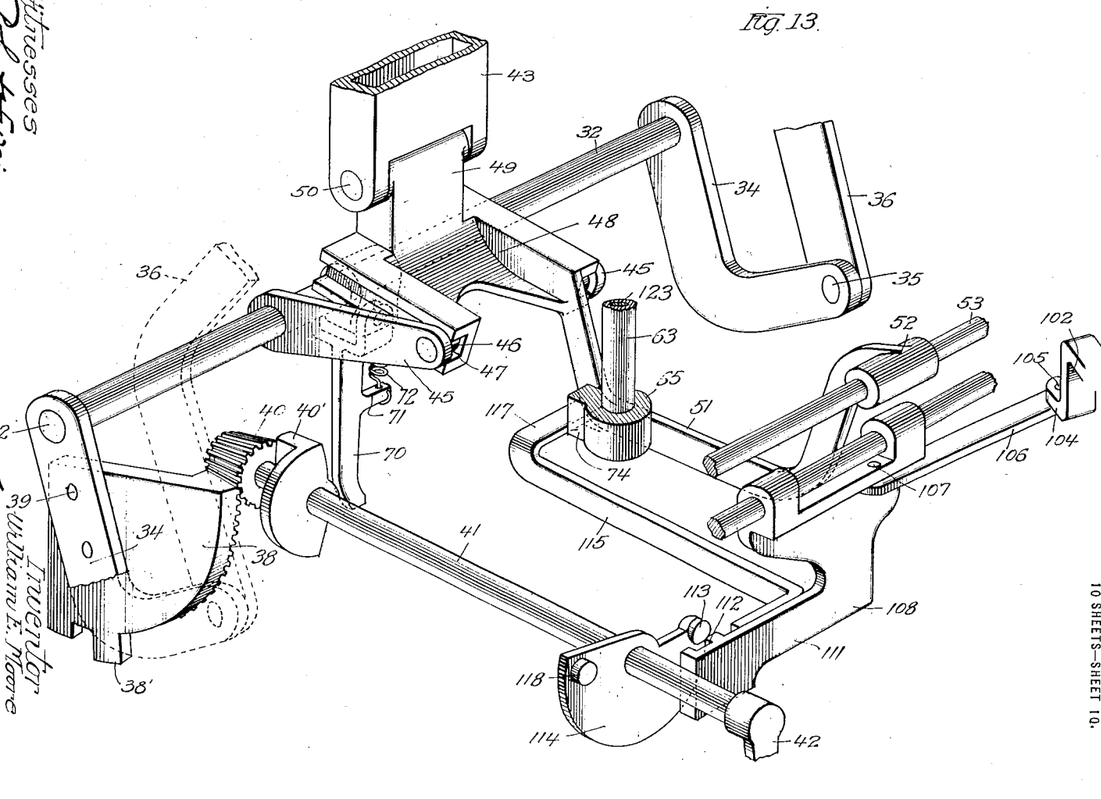
Fig. 13 is a pseudo perspective view of the operating mechanism.

In order to operate the ejectors subsequent to the removal of the plungers from the molds I have provided a collar 68 secured to the shaft 32 between the two arms 45, 45, its lower portion being perforated on a line extending at right angles to the shaft 32 to receive a pin 69 upon which is pivoted a depending arm 70 having intermediate its ends an outwardly extending finger 71 receiving the lower end of a coil 72, the upper end of which is fastened, as at 73, to the collar. The spring 72 normally maintains this arm 70 in a substantially vertical position as shown in Fig. 12 and on the movement of the shaft 32 by means of the crank and subsequent to the raising of the head, the arm 70 is brought into a substantially horizontal position where it engages the lower end of an outwardly extending rib 74 carried by the hub 65 of the ejector plate. The engagement of the arm 70 with the ejector plate raises the latter into the position shown in Fig. 6, ejecting the baked cone.

The batter or mixture from which the cones are made is contained within a tank or receptacle indicated in general by the numeral 75 and is arranged to normally lie at one side of the machine, but to be automatically swung over the molds when the head has been removed in order to deposit a measured quantity of batter into the molds for formation of other cones.

A projection 76 on one side of the rim 20 carries a vertically extending post 77 on which the tank is supported and by means of which it is operated. The tank proper comprises a bottom plate or member 78, having openings 79 which, when the tank is swung over the molds, register with the molds and through which the batter is deposited into the machine. Above the bottom of the tank 78 and spaced slightly therefrom is a second plate 80 having a similar number of openings into which are screw threaded short tubes or measuring cups 81, the lower ends of which slide upon the bottom plate 78. Directly above the plate 80 is a third stationary plate 82 having a similar number of holes adapted to register with the upper ends of the tubular measuring cups 81 when the plate 80 is swung into its right hand position and the lower ends of the tubes are out of alinement with the openings 79. A peripheral wall 83 incloses the plate and is covered at the top by a removable head 84. The wall 83 of the tank has outwardly extending lugs 85 at its ends for register with similar extending lugs 85' on the bottom plate, the pairs of lugs being secured together by thumb screws 86 so that the parts of the tank can be readily separated for cleaning. To insure proper rectilinear movement of the plate 80 between the two plates 78 and 82, downwardly extending pins 87 are provided in the upper plate 82 for engagement with parallel slots 88 in the sliding plate 80.

Figure 1:
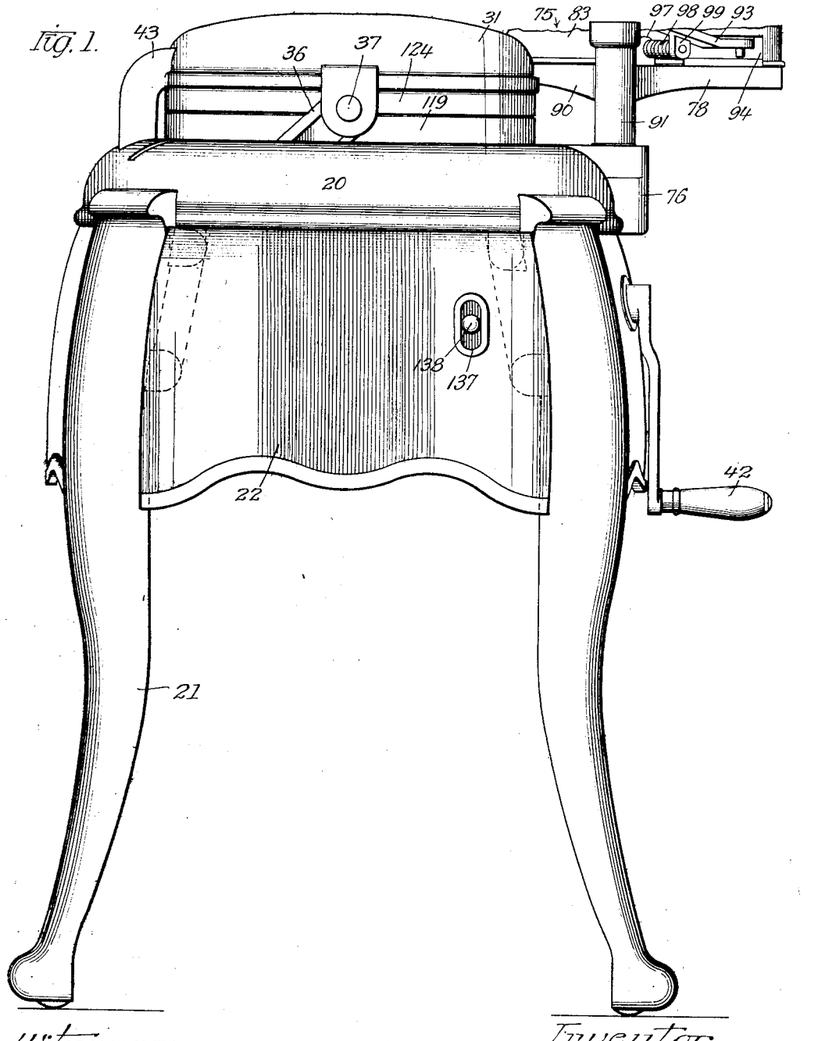
Figure 1 is a side elevation of my improved machine, the upper portion of the batter tank being broken away.
Figure 2:
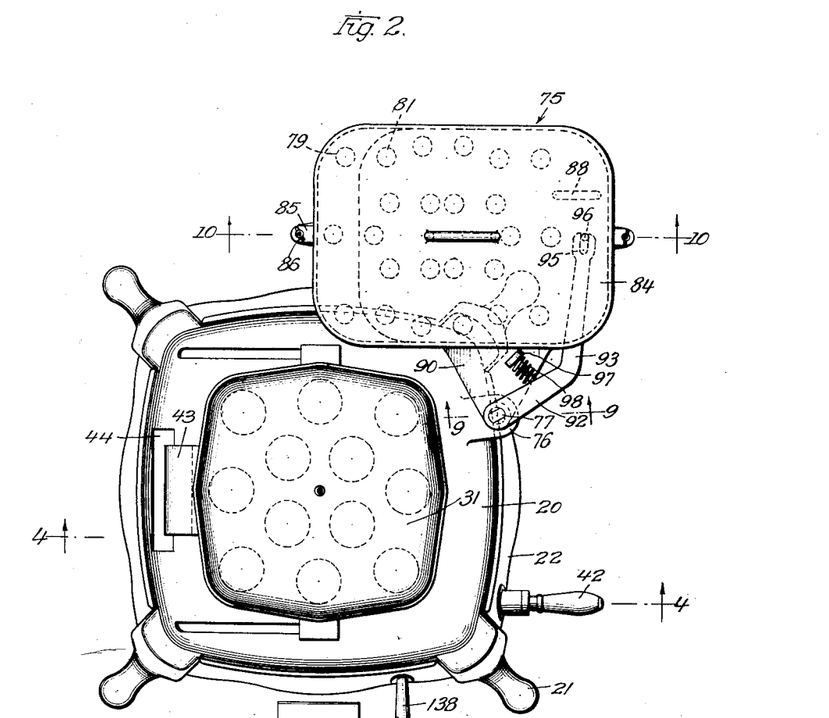
Fig. 2 is a plan view.
Figure 3:
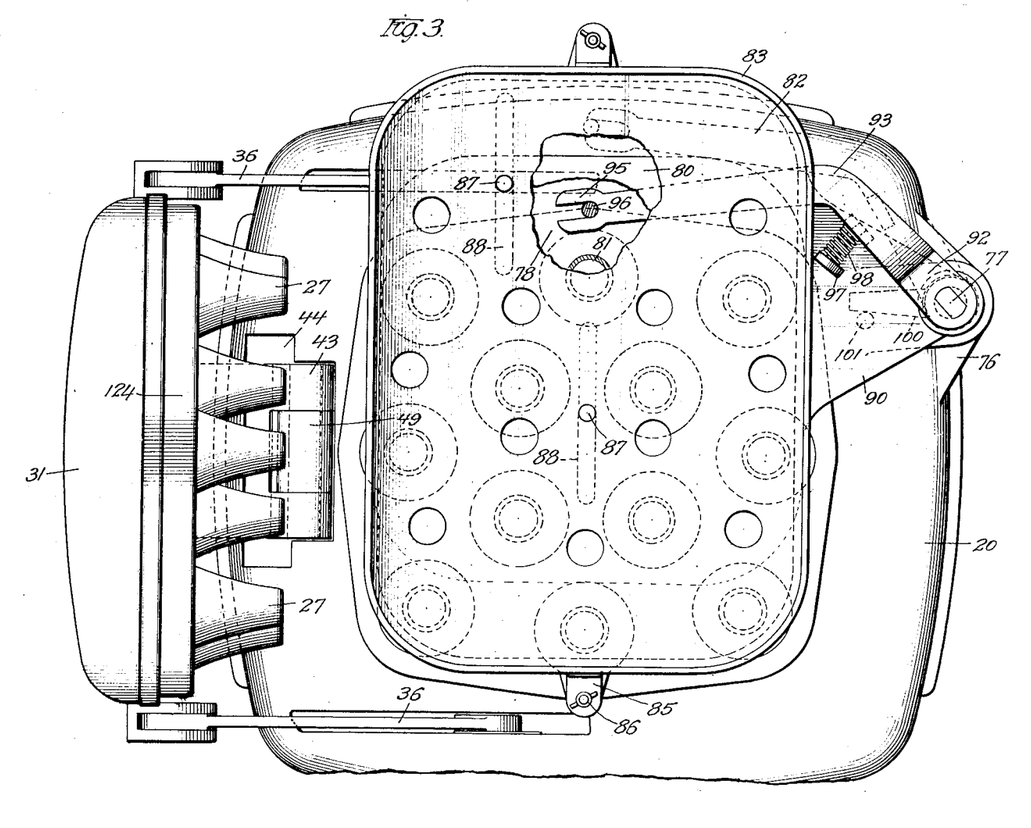
Fig. 3 is an enlarged plan view with the mold parts separated and the batter tank in position for operation.
Figure 10:
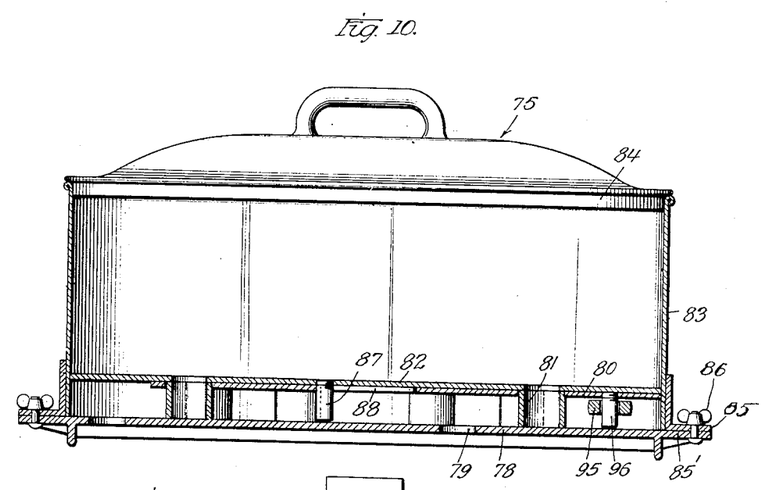
Fig. 10 is a vertical sectional view on the line 10—10 of Fig. 2 through the batter tank.
Figure 11:
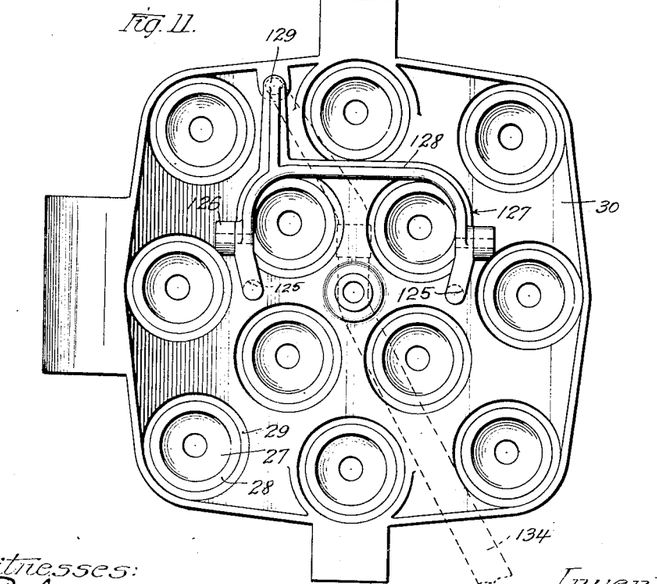
Fig. 11 is a plan view of the upper mold section with the cover removed.

The bottom plate 78 has an outwardly extending arm 90 carrying a vertical tubular post 91 at its outer end through which passes the post 77. An arm 92 is secured upon the upper end of the post 77 and is angled, as at 93, so that it may pass through a slot 94 formed in the side wall of the container at a horizontal point between the plates 82 and 78, the end of the arm being forked, as at 95, for engagement with a pin 96 carried on the sliding plate 80. It will be evident from the above that as the plate 80 is reciprocated within its chamber beneath the batter receptacle it will first, when in the position indicated in Fig. 10, receive in its measuring cups 81 measured charges of batter and on its movement to the left the upper ends of the cup will be cut off from the batter reservoir and the lower ends open through the apertures 79 to permit discharge of the batter into the molds. This movement of the automatic measuring and feeding device is accomplished by rotation of the post 77 about its axis within the lug 76, on the rim casting. An upwardly extending lip 97 on arm 90 is engaged by one end of a coil spring 98, the opposite end of which abuts against a depending lug 99 on the arm 92. On the lower end of the tubular bracket 91 I have provided an outwardly extending stop arm 100 which, when the tank has been swung into correct register with the mold engages a stop pin 101. The spring 98 insures the normal positioning of the feeding apparatus in the position shown in Fig. 10, but when power is applied to the post 77 and from thence transmitted through the arm 92 to the reciprocating carriage within the tank, the resistance of the spring 98 is sufficient to prevent relative movement of the measuring cups and plate 80 within the tank until after the tank, as a whole, has been swung about the post 77 into a position in register with the upper ends of the molds. The movement of the tank being then stopped by means of the arm 100 and pin 101, further movement of the shaft 77 compresses spring 98 and moves the plate 80 with its measuring cups 81 from the position shown in Fig. 10 to the left and into register with the openings 79 through which the batter is dropped into the cups. This function having been performed the reverse movement of the post 77 first causes the plate 80 to slide back into the charging position shown in Fig. 10, and subsequently carries the entire batter tank back away from the top of the machine into the position shown in Fig. 2.

The above described operation of the batter feeding apparatus is accomplished by rotation of the hand crank 42 after it has performed its function of separating the mold parts and swinging the mold head to one side of the table. A short lever 102 is secured, as at 103, on the lower end of the batter tank actuating post 77 and is bent downwardly at right angles to provide a horizontal lip 104 whereby the lever is joined by a vertical pivot pin 105 to a horizontal link 106. The opposite end of the link 106 is pivoted, as at 107, to a carriage 108 having upwardly extending arms 109 journaled upon a horizontal shaft 110 carried in the lower ends of the brackets 54 in which shaft 53 is also mounted. The carriage 108 is freely slidable as well as oscillatable upon the shaft 110 and its sliding movement actuates the lever 102 by means of which the batter tank is moved. A projection 111 extends to one side of the bottom of the carriage 108 and is provided with a vertical slotted head 112 adapted for engagement by a pin 113 projecting from a semi-circular plate 114 carried on shaft 41. An arm 115 is secured to the projection 111 of the carriage 108, as at 116, and extends across the center of the machine past the center guide post 63, its end portion being bent at right angles and formed in a stirrup 117 which is engaged by the lever 70 on shaft 32 when it is swung upwardly into position for engagement with the ejector. Normally the weight of the lever 115 swings the carriage 108 into the position shown in Fig. 4, so that the pin 113 cannot engage the slot 112. This permits rotation of the shaft through that period of its cycle in which the head is being elevated from the table. As soon as the cup ejector comes into action, however, the lever 70 simultaneously raises the stirrup 117 on the end of the arm 115 and thereby draws the carriage 108 over into vertical position, so that the slot 118 is engaged by pins 113 as it comes into register therewith and the carriage is swung to the right (looking at Fig. 8) actuating link 106 and swinging the batter tank over to measuring and discharging position. The first movement of the carriage 108 as it is slid to the right by means of the pin 113 and before the batter tank moves into discharge position draws the arm 115 with its stirrup 117, the end of the stirrup engaging the pivoted arm 70, to one side of the rib 74 of the ejector mechanism. This permits the ejector mechanism to drop back into its normal position to receive the batter.

In order to cause the movement of the head and batter tank in proper sequence I have made the length of the gear sector 38 such that the pinion 40 will overrun the last tooth when the head has been raised to the limit of the desired movement. The lever 70 then having moved carriage 108 into position so that it will be engaged by pin 113, further rotation of shaft 41 will have no effect upon shaft 32 but will, through the medium of the sliding carriage 108, actuate the batter feeding mechanism. The weight of the head tends to hold the gear sector in its inoperative position and in the absence of the single tooth gear 40' mounted at the rear of gear 40 which engages the projecting teeth 38' on the sector reverse movement of crank 42 would not bring gear 40 and sector 38 into mesh. With this arrangement however the first portion of the reverse rotation of crank handle 42 swings the batter tank to inoperative position, and the single tooth gear 40' having drawn the sector 38 into mesh with gear 40 further rotation lowers the head into position with the plungers inside the molds.

In order to prevent the edges of the cones from having irregular or frayed appearance I provide a shearing mechanism by means of which the edges of the cones, either before, during, or after they are baked, can be trimmed. This comprises a pair of reciprocable plates perforated to register with the openings in the molds and the reciprocation of which cuts off the fringes of batter extending beyond the molds. In the particular embodiment illustrated this apparatus comprises a lower plate 119 overlying the table 23 and having perforations to neatly interfit over the upper unthreaded ends of the molds 26 which project above the threaded engagement with the ribs 24 on the table 23. At its center the plate 119 is provided with a downwardly extending hub 120 to which is secured by means of a pin 121 the upper end of a shaft 123 which extends through the hollow center of the guide shaft 63. Vertical reciprocation of the shaft 123 will cause corresponding reciprocation of the plate 119.

A similar plate 124 is provided on the head and is similarly provided with apertures for register with the bases of the plungers 27. Any means to prevent plate 124 from falling off when the top is raised, may be used. This upper plate carries a pair of pins 125 secured thereto by pins 121' and positioned on diametrically opposite sides of the center of the head and projecting upwardly through the plate 30 in which the plungers are secured. A pair of upstanding ears 126 are provided on the plate 30 in which is pivoted the forked end 127 of a lever 128 by means of which the upper and lower shearing plates are reciprocated. The ends of the fork 127 overlie the upper ends of the pins 125 and the opposite end of the lever 128 extends to one side, as at 129, for engagement with the upper end of a short pin 130, the upper end of which is headed, as at 131, to prevent its dropping through. The lower end of the pin 130 registers with the upper end of a long pin 132 which extends down through the casing for engagement with the forwardly extending end 133 of a lever 134 pivoted, as at 135, on projections extending from nut 67 a slight projection or protuberance 136 being formed on the lever at the opposite side of its pivot for engagement with the lower end of the post 123. The lever 134 extends through an opening 137 in the apron of the casing and is provided with a handle 138 by means of which it is operated to vertically reciprocate plates 119 and 124. It will be evident from the above that depression of the handle 138 will raise the opposite end of the lever, elevating the plunger 132, and consequently raising the end 129 of the lever on the upper head. This causes depression of the forked ends of the levers, moving downwardly the upper and lower shearing plate. At the same time the protuberance 136 on the lever moves downwardly, permitting downward movement of the lower shear plate and its shaft 123. Reversing the movement of the handle moves the lower shear plate upward and at the same time permits upward movement of the upper plate, consequently reciprocation of the handle 138 causes upward and downward simultaneous movement of the two shearing plates, cutting the edges of any batter or pastry which may extend from the molds and between the plates.

Figure 4:
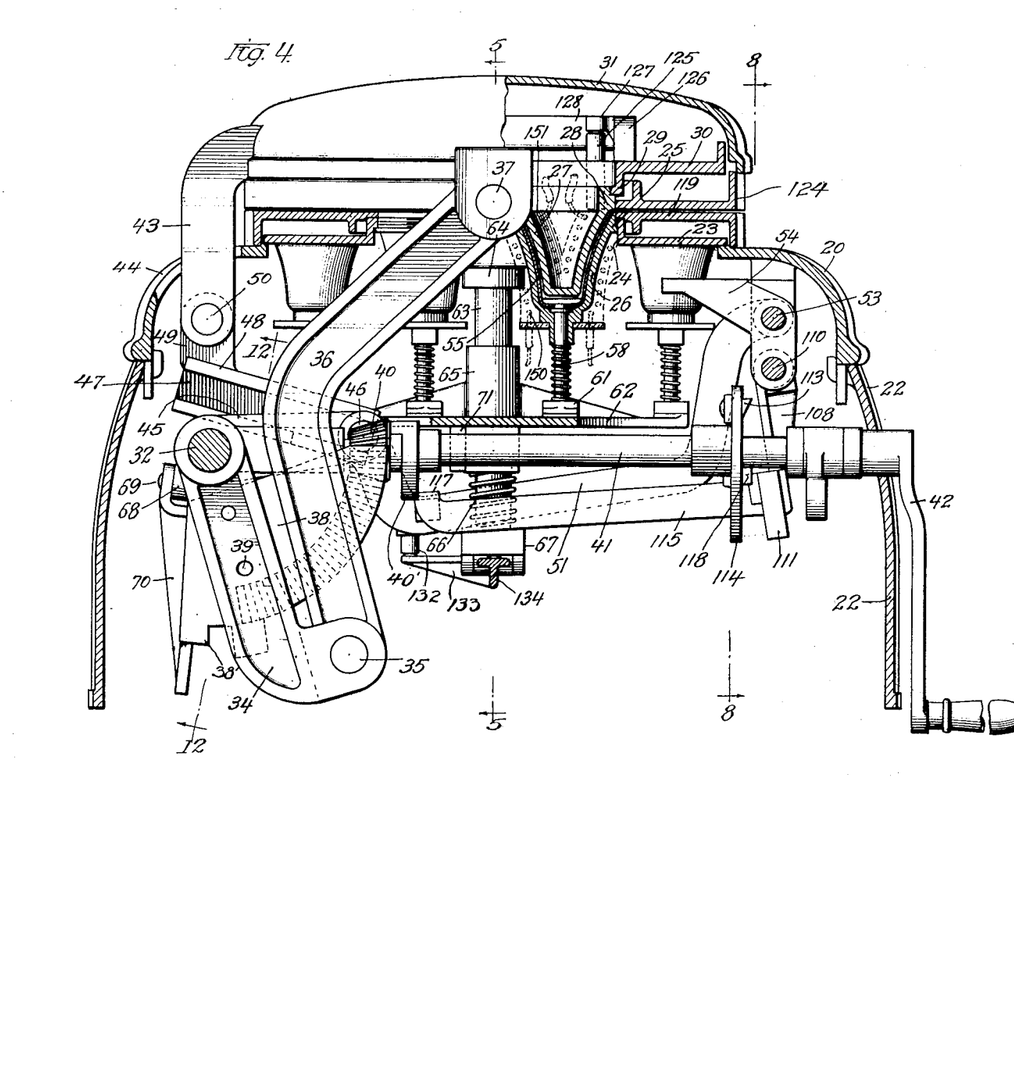
Fig. 4 is a vertical sectional view on the line 4—4 of Fig. 2.
Figure 5:
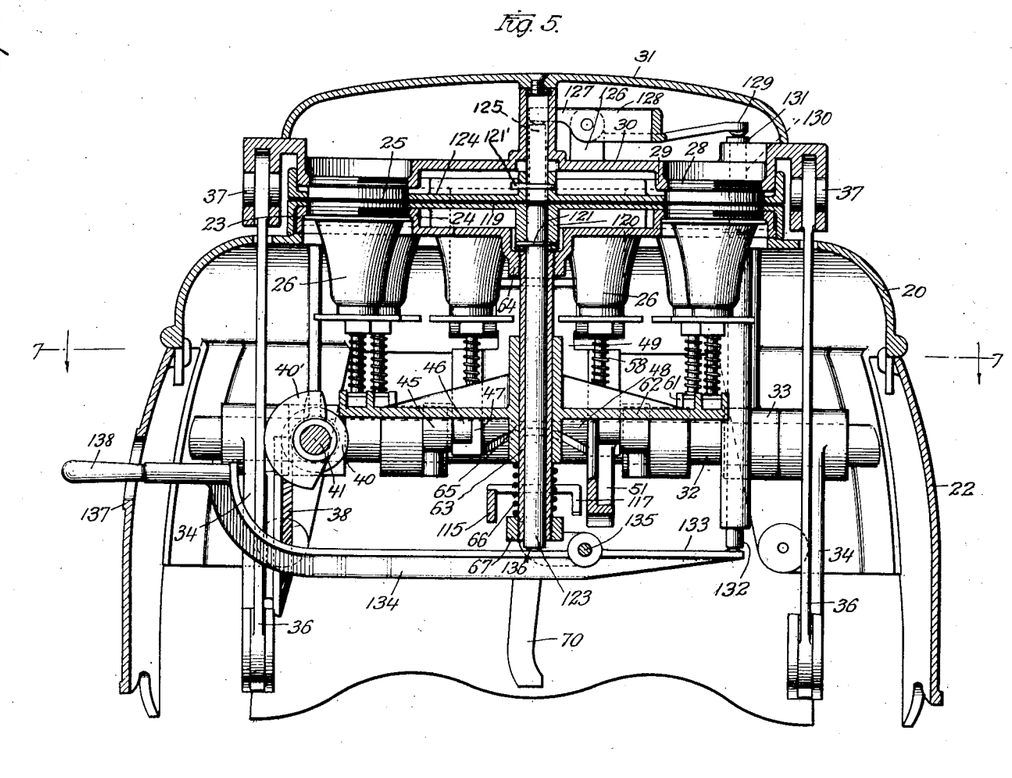
Fig. 5 is a vertical sectional view on the line 5—5 of Fig. 4.

From the above description of the apparatus and its operation, it is believed to be apparent that the machine may be readily operated by a person comparatively unskilled in such matters and satisfactory results obtained. Assuming the machine first to be in closed position and the batter tank filled, the first partial rotation of the hand crank will cause separation of the head and table, moving the head over into the position shown in Fig. 6. The ejector will then be operated, raising the liners into the position shown in Fig. 6 and immediately thereafter the liners will be dropped back into position and the batter tank swung over the mold and a charge of batter deposited in each cup. The reverse movement of the crank will then cause the batter tank to swing back into its idle position and the head to be moved downwardly until the plungers register at the proper depth within the molds. For the purpose of baking the cups I have indicated in Fig. 4 diagrammatically a series of electric heating coils 150 surrounding the mold 26 and a second series of heating coils 151 positioned within the plunger 27. The heat generated by resistance coils is ample to produce a temperature for baking the cones to the desired consistency and when the desired crispness has been reached and the edges sheared, the hand crank is again turned and the machine goes through another cycle of separating the mold parts, ejecting the cones, filling the molds with batter, and dropping the plungers into the molds.

Whereas I have illustrated and described a single embodiment of my invention, it will be obvious that many changes or alterations may be made therein without departing from the spirit of the invention or the scope of the appended claims.

Having described my invention, what I claim is:—

1. A machine for making pastry cups comprising a fixed table, a plurality of molds carried thereby an outwardly movable liner in each mold to eject the cups therefrom, a head, a plurality of plungers for shaping the interior of the cups carried by the head for coöperation with the molds, and means for moving the head on a line substantially parallel with the axes of the molds while the plungers and molds are in register and subsequently moving the head to one side of the table.

2. A machine for making pastry cups comprising a table, a plurality of spaced apart upwardly opening molds carried thereby an outwardly movable liner in each mold to eject the cups therefrom, a head, a plurality of downwardly projecting plungers for shaping the interiors of the cups carried by the head for coöperation with the molds, and means for moving the head vertically on a line substantially parallel with the axes of the molds while the plungers and molds are in register and subsequently swinging the head to one side of the table.

3. A machine for making pastry cups comprising a fixed table, a plurality of spaced apart upwardly opening molds carried thereby an outwardly movable two part liner in each mold to eject the cups therefrom, a head, a plurality of downwardly projecting plungers for shaping the interiors of the cups carried by the head for coöperation with the molds, and means for moving the head vertically on a line substantially parallel with the axes of the molds while the plungers and molds are in register and subsequently swinging the head to one side of the table into a reverse position with the plungers projecting upwardly.

4. A machine for making pastry cups comprising a table, a plurality of molds carried thereby, a head, a plurality of plungers for shaping the interiors of the cups carried by the head for coöperation with the molds, a pivotal mounting for the head at one side thereof, a lever connected with the head at a point spaced from the pivotal mounting, means for moving the pivotal mounting and lever on substantially vertical lines and at substantially the same rate of speed while the plungers and molds are in register and for moving the lever at a faster rate of speed than the pivotal mounting when the plungers and molds are not in register.

5. A machine for making pastry cups comprising a table, a plurality of molds carried thereby, a head, a plurality of plungers for shaping the interior of the cups and carried by the head for coöperation with the molds, a pivotal mounting for the head at one side thereof, a pair of levers connected to the head at opposite sides thereof and spaced away from the pivotal mounting, means for moving the pivotal mounting and levers on substantially vertical lines and at substantially the same rate of speed when the plungers and molds are in register and for moving the levers at a faster rate of speed than the pivotal mounting when the plungers are not in register.

6. A machine for making pastry cups comprising a table, a plurality of molds carried thereby, a head, a plurality of plungers for shaping the interior to the cups carried by the head for coöperation with the molds, a rotatable shaft, a crank carried by the shaft, a pivotal mounting for one side of the head, a connection between the pivotal mounting and crank, a second crank carried by the shaft and a link connecting the second crank with the head at a point spaced from the pivotal mounting.

7. A machine for making pastry cups comprising a table, a plurality of molds carried thereby, a head, a plurality of plungers for shaping the interiors of the cups carried by the heads for coöperation with the molds, a shaft, means for rotating the shaft, a crank carried by the shaft, a link pivotally connected with the head at one side thereof and slidably connected with the crank, a second crank, and a link connecting the second crank with the head at a point spaced from the pivotal connection with the first crank.

8. A machine for making pastry cups comprising a mold, a plunger for shaping the interior of the cup movable with respect to the mold, and a plate having an opening registering with the peripheries of the mold at its top neatly fitting about each said cup and movable with respect thereto to shear the edge of the cup while the plunger is in the cup.

9. A machine for making pastry cups comprising a mold, a plunger for shaping the interior of the cup movable with respect to the mold, and a plate having an opening registering with the peripheries of the mold at its top and movable with respect to the mold and plunger for shearing the edge of the cup while the plunger is in the cup.

10. A machine for making pastry cups comprising a mold, a plunger for shaping the interior of the cup movable with respect thereto, a plate having an aperture registering with the peripheries of the mold at its top, and movable with respect to the mold, a second plate having an aperture registering with the plunger and movable with respect thereto and means for simultaneously moving the two plates with respect to the mold and plunger for shearing the edges of the cup while the plunger is in the cup.

11. A machine for making pastry cups comprising a mold, a plunger for shaping the interior of the cup, movable with respect to the mold, a plate carried by the mold and having an aperture registering with peripheries at the top of the opening therein, a second plate carried by the plunger and having an aperture registering with the plunger, and means for moving said plates with respect to the mold and plunger while the plunger is in the cup.

12. A machine for making pastry cups comprising a table, a plurality of molds carried thereby, a head, a plurality of plungers for shaping the interiors of the cup carried by the head for coöperation with the molds, a plate mounted on the table and having apertures therein registering with the peripheries of the apertures in the molds at their tops, said plate being movable on a line parallel with the axes of the molds, a plate carried by the head and having apertures registering with the plungers, said plate being movable with respect to the plungers on a line parallel with their axes, and means for simultaneously moving said plates to shear the edges of the cup.

13. A machine for making pastry cups comprising a casing, a table carried by the casing, a plurality of molds supported in the table, a head, a plurality of plungers for shaping the interiors of the cup carried by the head for coöperation with the molds, a plate overlying the table and having apertures therein to register with the peripheries of the molds at their tops, a second plate carried by the head having apertures registering with the plungers, and means carried in the casing for simultaneously moving said plates upwardly and downwardly for shearing the edges of the cup.

14. A machine for making pastry cups comprising a mold, a plunger for shaping the interior of the cup movable with respect to the mold, a liner for said mold extending to the top of the mold and movable with respect thereto, and means for moving said liner with respect to the mold for ejecting the cups.

15. A machine for making pastry cups comprising a mold, a plunger for shaping the interior of the cup movable with respect to the mold, a plural part liner for the mold and means for moving the liner with respect to the mold to cause separation of its parts for ejection of the cup.

16. A machine for making pastry cups comprising a mold, a plunger for shaping the interior of the cup movable with respect to the mold, a plural part liner for the mold, the parts of which are separable in a plane intersecting the axis of the molds, and means for moving the liner upwardly from the mold to cause separation of the liner parts to eject the cup.

17. A machine for making pastry cups comprising a mold, a plunger for shaping the interior of the cup movable with respect to the mold, said liner being divided into two halves in a plane intersecting the axis of the mold, and means connected with the lower ends of the liner halves for moving the same upwardly with respect to the molds for separation thereof to eject the cup.

18. A machine for making pastry cups comprising a mold, a plunger for shaping the interior of the cup movable with respect to the mold, a liner for the mold comprising two separable half sections, a plunger extending through the bottom of the mold and loosely connected with the lower ends of the liner sections and means for actuating the plunger to move the liner sections upwardly in the mold to eject the cup.

19. A machine for making pastry cups comprising a mold, a plunger for shaping the interior of the cup movable with respect to the molds, a liner for said molds comprising a plurality of separable sections extending to the bottom of the mold, a plunger extending through the bottom of the mold and a head formed on the upper end of the plunger for engagement with the liner sections to move the same upwardly with respect to the mold for ejection of a cup.

20. A machine for making pastry cups comprising a mold, a plunger for shaping the interior of the cup movable with respect to the mold, a liner for the mold comprising a plurality of separable sections, each section extending to the bottom of the mold, a plunger projecting through the bottom of the mold, and through the lower end of the liner, a head on the upper end of the plunger overlying the lower ends of the liner sections, a second head on the plunger underlying the lower ends of the liner sections and means for reciprocating the plunger to cause movement of the liner sections with respect to the mold for ejection of a cup.

21. A machine for making pastry cups comprising a plurality of molds, a batter tank having openings in the bottom thereof for register with the molds, means for moving said tank to position its openings in register with the molds, means actuated by the tank moving means for dropping measured quantities of batter through the openings into the molds, plungers to distribute the batter in the molds and means to shear the upper edges of the cups, made from said batter.

22. A machine for making pastry cups comprising a plurality of molds, a batter tank having openings in the bottom thereof for register with the molds, means for moving said tank to position its openings in register with the molds, and a laterally movable plate, measuring cups carried thereby within the tank for feeding measured quantities of batter through the openings, said measuring cups being operable only when they are in register with the molds.

23. A machine for making pastry cups comprising a plurality of molds, a batter tank having openings in the bottom thereof for register with the molds, means for moving said tank to position its openings in register with the molds, and a laterally movable plate, measuring cups carried thereby within the tank for feeding measured quantities of batter through the openings, said batter measuring means being operated by the tank moving means after the tank has been moved into position with its openings in register with the molds.

24. A machine for making pastry cups comprising a plurality of molds, a batter tank having openings in the bottom thereof for register with the molds, means for moving said tank to position its openings in register with the molds, a laterally movable plate, measuring cups carried thereby within the tank for feeding measured quantities of batter through the openings, driving means resiliently connected with the tank for moving it into position for register of its opening with the molds, a stop to prevent further movement of the tank and a connection between the tank moving means and the batter measuring means whereby the latter is operated by the tank moving means after the tank has completed its movement.

25. A machine for making pastry cups comprising a table, a plurality of molds carried thereby, a plurality of plungers for registry with the molds to form the interior of the cups, a head to which the plungers are connected, means for moving the head to separate the plungers from the molds, a batter tank connected to the table, outlets in the tank for registry with the molds when the tank is moved over the table, a measuring device for dropping measured quantities of batter through the outlets, means for moving the batter tank, and means connecting the tank moving means to the head moving means after the head has been moved out of register with the table.

26. A machine for making pastry cups comprising a table, a plurality of molds carried thereby, a plurality of plungers for registry with the molds to form the interior of the cups, a head to which the plungers are connected, means for moving the head to separate the plungers from the molds, a batter tank connected to the table, outlets in the tank for registry with the molds when the tank is moved over the table, a measuring device for dropping measured quantities of batter through the outlets, means for moving the tank, means actuated by the tank moving means for actuating the batter measuring means, and means connecting the tank moving means to the head moving means after the head has been moved out of register with the table.

27. A machine for making pastry cups comprising a table, a plurality of molds carried thereby, a plurality of plungers for registry with the molds to form the interior of the cups, a head to which the plungers are connected, driving means connected with the head for moving the same out of register with the table, a batter tank connected to the table, outlets in the tank for registry with the molds when the tank is moved over the table, a measuring device for dropping measured quantities of batter through the outlets, means for moving the batter tank, a connection between the driving means and the tank moving means, and means for disabling said connection when the head is in register with the table.

28. A machine for making pastry cups comprising a table, a plurality of molds carried thereby, a plurality of plungers for registry with the molds to form the interior of the cups, a head to which the plungers are connected, driving means connected with the head for moving the same out of register with the table, a batter tank connected to the table, outlets in the tank for registry with the molds when the tank is moved over the table, a measuring device for dropping measured quantities of batter through the outlets, means for moving the batter tank, cup ejectors within the molds, means operated by the driving means for actuating the cup ejectors subsequent to the removal of the head from register with the table, and means operated by the ejector actuating means for connecting the tank moving means to the driving means.

In testimony whereof I hereunto set my hand in the presence of two subscribing witnesses.

WILLIAM E. MOORE.

In the presence of—
 JOSEPH SLYE,
 LOUIS H. WARD.